United States Patent Office 3,113,986
Patented Dec. 10, 1963

3,113,986
HYDROGENATION OF UNSATURATED
HYDROCARBONS
David S. Breslow and Albert S. Matlack, Wilmington,
Del., assignors to Hercules Powder Company, Wilmington, Del., a corporation of Delaware
No Drawing. Filed Jan. 8, 1962, Ser. No. 165,040
16 Claims. (Cl. 260—683.9)

This invention relates to a homogeneous system for the catalytic hydrogenation of unsaturated hydrocarbons, and more particularly to the hydrogenation of ethylenically and acetylenically unsaturated hydrocarbons with a soluble catalyst formed by mixing a metal alkoxide with a hydrocarbon-aluminum compound.

The catalytic reduction of unsaturated hydrocarbons is well known. However, these systems are for the most part heterogeneous as, for example, hydrogenation with a noble metal catalyst, such as palladium, platinum, Raney nickel, etc. Such systems wherein the catalyst is insoluble in the reaction mixture are highly susceptible to catalyst poisoning. Generally speaking, catalytic hydrogenations require relatively high hydrogen pressures and frequently also high temperatures, etc.

Now in accordance with this invention, it has been found that aliphatically unsaturated hydrocarbons may be hydrogenated in a homogeneous system under relatively low hydrogen pressure by means of the catalyst produced on mixing a hydrocarbon-aluminum compound with a transition metal compound which contains at least one alkoxide group linked to the metal through the alkoxide oxygen, which reaction product is soluble in the reaction mixture.

It is now well recognized that when an aluminum alkyl, or other hydrocarbon-aluminum compound, is reacted with a transition metal compound, a reaction takes place which generally involves at least a partial reduction in the valence of the transition metal. Just what is the exact nature of the resulting product is not known. In the case of the transition metal alkoxides, such as the titanic esters and vanadic esters with a hydrocarbon-aluminum, the reaction product is soluble in many hydrocarbon diluents. It is these soluble catalysts that are effective as hydrogenation catalysts, and they provide a homogeneous hydrogenation system.

Exemplary of the transition metal alkoxides that can be used as one component in the production of the catalyst used in this invention are the alkoxides of the metals of groups IV–B and V–B, VI–B, VII–B and VIII of the periodic table as, for example, the tetraalkyl titanates, such as titanium tetraethoxide, titanium tetra-n-propoxide, titanium tetraisopropoxide, titanium tetra-n-butoxide, titanium tetraisobutoxide, titanium tetra(s-butoxide), tetra(n-amyl)titanate, tetraoctyl titanate, and the corresponding zirconium, hafnium, and thorium alkoxides, the trialkyl orthovanadates, such as triethyl orthovanadate, tri(n-propyl)orthovanadate, tri(n-butyl)orthovanadate, tri(tert.-butyl)vanadate, trioctyl orthovanadate, vanadium triacetylacetonate, vanidium oxy diacetylacetonate, vanadium oxy triacetylacetonate, etc., and the corresponding compounds of niobium, tantalum, etc., chromium tetratert.-butoxide, chromium triacetylacetonate, molybdenum dioxydiacetylacetonate, manganese triacetylacetonate, ferric triacetylacetonate, ferric triethoxide, ferric triisopropoxide, ferric tri-n-butoxide, cobalt triacetylacetonate, nickel diacetylacetonate, cobaltous diethoxide, cobaltous di-n-butoxide, cobaltous di-n-amyloxide, ruthenium triacetylacetonate, palladium diacetylacetonate, etc.

Any hydrocarbon-aluminum compound having the formula $AlR_3$, where at least one of the R's is a hydrocarbon radical and the other R's may be hydrogen or a hydrocarbon radical can be used as the second component in producing the catalyst used in accordance with this invention. Exemplary of such aluminum compounds are triethylaluminum, tri-n-propylaluminum, triisopropylaluminum, tri-n-butylaluminum, triisobutylaluminum, triamylaluminum, trihexylaluminum, trioctylaluminum, tri-2-ethylhexylaluminum, tricyclohexylaluminum, triphenylaluminum, tribenzylaluminum, diethylaluminum hydride, diisobutylaluminum hydride, etc., and mixtures of any of these aluminum compounds.

The reaction of the transition metal compound and the hydrocarbon-aluminum compound is preferably done in situ by adding either one of the catalyst components to the reactor at the beginning of the reaction, and the second catalyst component then added continuously or incrementally during the reaction, or both catalyst components may be added either continuously or incrementally throughout the hydrogenation reaction. The catalyst components may be prereacted and used for the hydrogenation reaction if this prereaction is carried out under hydrogen and the unsaturated hydrocarbon then added to the catalyst. The hydrocarbon-aluminum compound and metal alkoxide are generally used in a molar ratio of from about 1.3:1 to about 20:1, preferably from about 2:1 to about 10:1 and more preferably from about 2:1 to about 8:1, the more preferred ratios depending upon the particular compounds used, the unsaturated hydrocarbon being reduced, etc. Thus, in the case of the orthovanadates there is preferably used at least about one aluminum for every oxygen in the vanadium compound as, for example, a ratio of at least about 4:1 in a case of a trialkyl orthovanadate, a ratio of at least about 6:1 in the case of vanadium triacetylacetonate, etc. In the same way, the rate of reaction increases steadily from 1:1 up to 9:1 in the case of chromium triacetylacetonate so that again the preferred ratio is at least one aluminum for every oxygen in the chromium compound. The amount of the catalyst used for the hydrogenation reaction may be varied over a wide range and will depend somewhat upon the hydrogenation conditions and the unsaturated hydrocarbon that is being hydrogenated. Generally the amount of catalyst will be from about 0.01% to about 100% of the transition metal compound based on the weight of the unsaturated hydrocarbon being hydrogenated, and preferably will be from about 0.1% to about 10%.

Any hydrocarbon containing aliphatic unsaturation, that is, ethylenic or acetylenic unsaturation, may be reduced by the process of this invention. Exemplary of these aliphatically unsaturated hydrocarbons that may be hydrogenated are olefins and cycloolefins, such as butene-1, butene-2, 2-methylbutene-2, 2,3-dimethylbutene-2, amylene, hexene-1, hexene-2, 2-methylpentene-1,2-methylhexene-2, heptene-1, heptene-2, octene, dodecene, cyclohexene, methylcyclohexene, vinylcyclohexane, styrene, α-methylstyrene, etc., and acetylenic hydrocarbons, such as acetylene, propyne, butyne, ethynylbenzene, etc., and polyunsaturated hydrocarbons such as allenes, dienes, polyenes, diynes, etc., such as allene, isoprene, vinylcyclohexene, etc., and mixtures of any of these unsaturated hydrocarbons. The process of this invention is accordingly of considerable importance in the hydrogenation of gasoline fractions, etc. It is also useful for the selective hydrogenation of feedstocks containing aliphatically and aromatically unsaturated hydrocarbons since only the aliphatic unsaturation is hydrogenated. Unsaturated hydrocarbon rubbers, as for example, natural rubber, polyisoprene, etc., can be hydrogenated, partially or completely, if desired, whereby they are made more resistant to attack by ozone.

The hydrogenation reactions of this invention are preferably carried out in an inert hydrocarbon diluent in which the catalyst and unsaturated hydrocarbon are soluble. Exemplary of such diluents are aliphatic hydrocarbons, such as heptane, octane, nonane, decane, cycloaliphatic hydrocarbons, such as cyclohexane, methylcyclohexane, and aromatic hydrocarbons, such as benzene, toluene, xylene, chlorobenzene, etc. In the case of unsaturated hydrocarbons which are not readily polymerized by the catalysts of this invention as, for example, cyclohexene, etc., the process may readily be carried out in the absence of a diluent.

To avoid or reduce any polymerization of these aliphatically unsaturated hydrocarbons which may occur in the case of those olefins, etc., that are readily polymerized by the catalysts of this invention, the hydrogen is introduced into the system prior to the formation of the catalyst or along with the prereacted catalyst. Thus, if the catalyst ingredients are prereacted under hydrogen, this mixture may then be added to the polymerization system or the aliphatically unsaturated hydrocarbon may be added to it. If the catalyst ingredients are reacted in situ, the hydrogen is introduced prior to the addition of at least one of the catalyst ingredients or prior to the addition of the olefin. In a continuous operation, and particularly in the case of gaseous hydrocarbons, the addition of the hydrogen is most readily accomplished by charging a mixed stream of olefin and hydrogen. Because the homogeneity of the system and the high activity of these hydrogenation catalysts, relatively low hydrogen pressures are required. Thus, the process may be operated under only a few pounds of hydrogen, and in fact, at least less than 1 atmosphere if desired, but pressures up to as high as 5000 p.s.i. may be used if desired. In the same way, relatively low temperatures are required for the catalytic hydrogenation of this invention. Generally, the process will be carried out at a temperature of from about −50° C. to about 200° C., and preferably from about 0° C. to about 100° C.

As will be apparent to those skilled in the art, the process of this invention offers many advantages over the hydrogenation processes of the prior art. The catalyst used in this process is not readily poisoned so that exhaustive purification prior to the reduction process is not required as in many of the prior art processes. Frequently much lower catalyst levels can be used. The ability to operate at low pressure effects substantial economies in equipment costs. Since the process can be operated at much lower temperatures than previously used, less by-products are formed since side reactions such as hydrogenolysis are minimized.

The following examples will illustrate the hydrogenation of aliphatically unsaturated hydrocarbons in accordance with this invention. All parts and percentages are by weight unless otherwise indicated.

*Example 1*

The reaction vessel was evacuated and filled with nitrogen and this process repeated, and then it was evacuated and filled with hydrogen to 5 p.s.i. To the vessel was then charged two parts of cyclohexene, 15 parts of n-heptane, 0.1 part of tetra(isopropyl)titanate and 0.2 part of triisobutyl-aluminum added as a 1.01 M solution in heptane. The vessel was then pressured to 50 p.s.i. with hydrogen and tumbled for 16 hours at room temperature. The pressured dropped from 50 p.s.i. to 34 p.s.i. during this time. The vessel was then vented, water was then added to destroy the catalyst, and the organic layer was separated and dried. Analysis of the product showed that the cyclohexene had been quantitatively reduced to cyclohexane.

*Example 2*

The above example was repeated except that two parts of 1-octene were used in place of the cyclohexene used in that example. At the end of 16 hours the pressure had dropped to 34 p.s.i. It was found that 94% of the 1-octene had been reduced to yield n-octane.

*Example 3*

Example 1 was repeated except that 1 part of ethynylbenzene was used in place of the cyclohexene used in that example. At the end of the reaction the final pressure was 35 p.s.i. Analysis of the product showed that the ethynylbenzene had been reduced completely to ethylbenzene.

*Example 4*

Following the general procedure described in Example 1, cyclohexene was reduced using as the catalyst 0.10 part of tri(n-butyl)vanadate added as a 0.733 M solution in heptane and 2.8 parts of triisobutylaluminum added as a 1.01 M solution in heptane (4:1 molar ratio of aluminum to vanadium). The reaction was carried out at 40° C. At the end of the 16-hour reaction period, the product was separated, and it was found that the cyclohexene had been quantitatively reduced to cyclohexane.

*Example 5*

The process of Example 4 was repeated except that two parts of 1-octene was substituted for the cyclohexene used in that example. On isolation of the product it was found that the octene had been quantitatively reduced to n-octane.

*Example 6*

The process of Example 1 was repeated except that in place of triisobutylaluminum used in that example, there was used a mixture of diisobutylaluminum hydride and triisobutylaluminum, which mixture contained about 60% of the diisobutylaluminum hydride. On isolation of the product it was found that the cyclohexene had been quantitatively reduced to cyclohexane.

*Example 7*

Polyisoprene rubber, which had been milled for 5 minutes at 125° F., was dissolved in heptane to form a 5 percent by weight solution. A reaction vessel was charged with 26.8 parts of this rubber solution, and under a hydrogen atmosphere there was then added 0.19 part of tetra(isopropyl)titanate and 0.4 part of triisobutylaluminum added as a 0.86 M solution in heptane. The vessel was pressured with hydrogen to 43 p.s.i. and then agitated on a shaker for 43 hours at room temperature. The final pressure was 27 p.s.i. The vessel was then vented, and water was added to destroy the catalyst. The resulting mixture was diluted with about 150 parts of heptane, and the insoluble catalyst residues were removed by filtration. The organic layer was separated, and the heptane was removed by evaporation, leaving 1.29 parts of elastomer. The Kemp bromine number of this material was 125 in contrast to the 230 of the original rubber, showing that the polyisoprene had been hydrogenated to about 50%.

*Example 8*

An 8-oz. reaction vessel was charged with 0.145 g. of chromic triacetylacetonate and then capped. Under a hydrogen atmosphere there was then charged by syringe, 15.0 ml. of n-heptane (treated to remove unsaturation), 1.62 g. of cyclohexene and 4.9 ml. of a 0.95 M solution of triisobutylaluminum in n-heptane. The vessel was then pressured to 40 p.s.i.g. with hydrogen and agitated at room temperature for 22 hours. At the end of this time the pressure had dropped to 5 p.s.i.g. The catalyst was decomposed by addition of water and the resulting mixture was dried over magnesium sulfate, filtered and distilled. Mass spectral analysis of the fraction boiling from 90–94° indicated the presence of 35.7 mole percent cyclohexane and 0.50 mole percent cyclohexene.

*Example 9*

An 8-oz. vessel was charged with 0.098 g. of molybdenum dioxydiacetylacetonate, 15.0 ml. of n-heptane, 2.20 g. of octene-1 and 1.80 ml. of a 1.02 M solution of triisobutylaluminum in n-heptane as described in Example 8. The vessel was then pressured to 40 p.s.i.g. with hydrogen and agitated at room temperature for 21 hours, at the end of which period the pressure had dropped to 9 p.s.i.g. The product was prepared for analysis as described in Example 8. Mass spectral analysis indicated the presence of 18.4 mole percent n-octane. No octene-1 was detected.

*Example 10*

An 8-oz. vessel was charged with 0.105 g. of manganic triacetylacetonate, 15.0 ml. of heptane, 1.62 g. of cyclohexene and 1.80 ml. of a 1.02 M solution of triisobutylaluminum in n-heptane as described in Example 8. The vessel was then pressured to 40 p.s.i.g. with hydrogen and agitated at room temperature for 21 hours, at the end of which period the pressure had dropped to 8.4 p.s.i.g. The product was prepared for analysis as in Example 8. The mass spectrum indicated the presence of 13.0 mole percent cyclohexane and a maximum of 0.2 mole percent cyclohexene.

*Example 11*

An 8-oz. vessel was charged with 0.120 g. of ruthenium triacetylacetonate, 14.0 ml. of heptane, 2.20 g. of octene-1 and 2.10 ml. of a 1.02 M solution of triisobutylaluminum in n-heptane as described in Example 8. The vessel was pressured to 40 p.s.i.g. with hydrogen and agitated at 40–50° for 16 hours. At the end of this time the pressure was 7.5 p.s.i.g. The product was prepared for analysis by the method described in Example 8. The mass spectrum showed that the solution contained 20.1 mole percent n-octane. No octene-1 was detected.

*Example 12*

An 8-oz. vessel was charged with 0.107 g. of cobaltic triacetylacetonate, 2.20 g. of octene-1, 15.0 ml. of heptane and 1.80 ml. of a 1.02 M solution of triisobutylaluminum in n-heptane as described in Example 8. The vessel was pressured to 40 p.s.i.g. with hydrogen and agitated at room temperature for 21 hours. At the end of this time the pressure was 9.7 p.s.i.g. After destruction of the catalyst the mass spectrum of the solution showed the presence of 18.9 mole percent n-octane. No octene-1 was detected.

*Example 13*

An 8-oz. vessel was charged with 0.106 g. of ferric triacetylacetonate, 15.0 ml. of heptane, 1.37 g. of 2-methylbutene-2 and 1.80 ml. of a 1.02 M n-heptane solution of triisobutylaluminum as described in Example 8. The vessel was pressured to 40 p.s.i.g. with hydrogen and agitated at room temperature for 20.5 hours. At the end of this period the pressure had dropped to 12 p.s.i.g. After destruction of the catalyst the mass spectrum of the heptane solution showed the presence of 6.8 mole percent isopentane and a maximum of 0.1 mole percent 2-methylbutene-2.

*Example 14*

An 8-oz. reaction vessel was charged with 0.077 g. of nickel diacetylacetonate and then capped. Under a hydrogen atmosphere there was then charged by syringe 15.0 ml. of n-heptane (treated to remove unsaturation), 2.20 g. of octene-1 and 1.5 ml. of a 1.02 M solution of triisobutylaluminum in n-heptane. The vessel was then pressured to 40 p.s.i.g. with hydrogen and agitated at room temperature for 4 hours. At the end of this time the pressure had dropped to 10 p.s.i.g. The catalyst was decomposed by addition of water and the resulting mixture was dried over magnesium sulfate and filtered. The filtrate was inert to a solution of bromine in carbon tetrachloride demonstrating the absence of unsaturation.

*Example 15*

An 8-oz. vessel was charged with 0.102 g. of palladium diacetylacetonate, 15.0 ml. of n-heptane, 2.20 g. of octene-1 and 1.5 ml. of a 1.02 M solution of triisobutylaluminum in n-heptane. The vessel was pressured to 40 p.s.i.g. with hydrogen and agitated at 50° for 4.5 hours. At the end of this time the pressure had dropped to 12 p.s.i.g. The product analyzed as in Example 14 showed the absence of unsaturation.

*Example 16*

An 8-oz. vessel was charged with 16.8 g. of hexene-1 and 0.90 ml. of a catalyst solution prepared from 0.510 g. of cobaltic triacetylacetonate and 8.7 ml. of a 0.99 M solution of triisobutylaluminum in n-heptane. The vessel was agitated at 30° C. while kept at a constant hydrogen pressure of 21 p.s.i.g. After 2 hours hydrogen absorption stopped and the catalyst was decomposed by addition of water. The resulting mixture was dried over magnesium sulfate, filtered and distilled. The distillate, B.P. 69.5° C., $n_D^{20}$ 1.3745 (n-hexane, B.P. 69° C., $n_D^{20}$ 1.375) was inert to bromine in carbon tetrachloride and was not further hydrogenated upon treatment with fresh catalyst.

*Example 17*

An 8-oz. reaction vessel containing a hydrogen atmosphere was charged with 0.096 g. of tetraisopropyl titanate, 15.0 ml. of n-heptane, 1.40 g. of 2-methylbutene-2 and 1.50 ml. of a 0.95 M solution of triisobutyl aluminum in n-heptane by syringe. The vessel was then pressured to 40 p.s.i.g. with hydrogen. After agitation at 30° C. for one hour the pressure had dropped to 30 p.s.i.g. This corresponds to 33% hydrogenation.

*Example 18*

An 8-oz. pressure vessel was charged with 0.105 g. of chromic triacetylacetonate, 20.0 ml. of n-heptane, 1.63 g. of tetramethylethylene, and 1.9 ml. of a 0.99 M solution of triisobutylaluminum in n-heptane. The vessel was pressured to 35 p.s.i.g. with hydrogen and agitated at 50° C. for 18 hours. At the end of this time the pressure had dropped to 14 p.s.i.g. The catalyst was decomposed by addition of water and the resulting mixture was dried over magnesium sulfate, filtered, and distilled. Mass spectral analysis of the fraction boiling below 90° C. indicated the presence of 38.0 mole percent of 2,3-dimethylbutane and 12.7 mole percent of tetramethylethylene.

An outstanding advantage in the hydrogenation process of this invention is that the catalysts are not subject to poisoning by sulfur compounds, etc., as are the heterogeneous catalysts. Thus, the process is much more versatile, and it is not necessary to remove these materials that would poison other catalysts. The following examples demonstrate hydrogenation in accordance with this invention in the presence of thiophene, normally considered as a sulfur poison in such reactions, and also in the presence of an ether.

*Example 19*

An 8-oz. vessel was charged with 0.107 g. of cobaltic triacetylacetonate and then capped. Under a hydrogen atmosphere the bottle was then charged by syringe with 15.0 ml. of heptane and 1.90 ml. of a 0.95 M solution of triisobutylaluminum in n-heptane. After 30 min. 1.0 ml. of 2.0 M solution of thiophene in heptane was injected, and the bottle was pressured at 35 p.s.i.g. with hydrogen. After an additional 10 min. 1.62 g. of cyclohexene was injected. The bottle was agitated at 50° for 22 hours. At the end of this time the pressure was 10 p.s.i.g. corresponding to 83% reduction.

*Example 20*

An 8-oz. reaction vessel containing a hydrogen atmosphere was charged by syringe with 0.096 g. of tetraisopropyl titanate, 1.62 g. of cyclohexene, 13.0 ml. of n-heptane, 2.0 ml. of diisopropylether and 2.0 ml. of a 0.95 M solution of triisobutyl-aluminum in n-heptane. The vessel was then pressured to 40 p.s.i.g. with hydrogen and agitated at room temperature for 16 hours. At the end of this time the pressure had dropped to 27 p.s.i.g. This corresponds to 43% reduction.

This application is a continuation-in-part of our U.S. application Serial No. 91,620, filed February 27, 1961, now abandoned.

What we claim and desire to protect by Letters Patent is:

1. The process of hydrogenating an aliphatically unsaturated hydrocarbon which comprises contacting said aliphatically unsaturated hydrocarbon with hydrogen in the presence of the catalyst formed by mixing a hydrocarbon-aluminum compound having the formula $AlR_3$, where at least one R is a hydrocarbon radical and the remaining R's are selected from the group consisting of hydrogen and hydrocarbon radicals, with an alkoxide of a metal selected from the group consisting of the metals of groups IV–B, V–B, VI–B, VII–B and VIII of the periodic table, said metal alkoxide being soluble in the reaction mixture.

2. The process of claim 1 wherein the metal alkoxide is a titanium tetraalkoxide.

3. The process of claim 1 wherein the metal alkoxide is a trialkyl orthovanadate.

4. The process of claim 1 wherein the metal alkoxide is cobalt triacetylacetonate.

5. The process of claim 1 wherein the metal alkoxide is chromium triacetylacetonate.

6. The process of claim 1 wherein the hydrocarbon-aluminum compound is a trialkylaluminum.

7. The process of claim 1 wherein the hydrocarbon-aluminum compound is a dialkylaluminum hydride.

8. The process of hydrogenating a 1-octene which comprises contacting 1-octene with hydrogen in the presence of the catalyst formed by mixing a trialkylaluminum with a titanium tetraalkoxide.

9. The process of hydrogenating cyclohexene which comprises contacting cyclohexene with hydrogen in the presence of the catalyst formed by mixing a trialkylaluminum with a titanium tetraalkoxide.

10. The process of hydrogenating ethynylbenzene which comprises contacting ethynylbenzene with hydrogen in the presence of the catalyst formed by mixing a trialkylaluminum with a titanium tetraalkoxide.

11. The process of hydrogenating a 1-octene which comprises contacting 1-octene with hydrogen in the presence of the catalyst formed by mixing a trialkylaluminum with a trialkyl orthovanadate.

12. The process of hydrogenating cyclohexene which comprises contacting cyclohexene with hydrogen in the presence of the catalyst formed by mixing a trialkylaluminum with a trialkyl orthovanadate.

13. The process of hydrogenating a 1-octene which comprises contacting 1-octene with hydrogen in the presence of the catalyst formed by mixing a trialkylaluminum with cobalt triacetylacetonate.

14. The process of hydrogenating cyclohexene which comprises contacting cyclohexene with hydrogen in the presence of the catalyst formed by mixing a trialkylaluminum with cobalt triacetylacetonate.

15. The process of hydrogenating a 1-octene which comprises contacting 1-octene with hydrogen in the presence of the catalyst formed by mixing triisobutylaluminum with tetra(isopropyl)titanate.

16. The process of hydrogenating cyclohexene which comprises contacting cyclohexene with hydrogen in the presence of the catalyst formed by mixing triisobutylaluminum with tri(n-butyl)vanadate.

References Cited in the file of this patent

UNITED STATES PATENTS 3,058,973   Greenwell _____ Oct. 16, 1962